March 31, 1964     J. T. HARRIS     3,127,589
VOLTAGE PARAMETER MONITORING DEVICE
Filed March 6, 1962     2 Sheets-Sheet 1
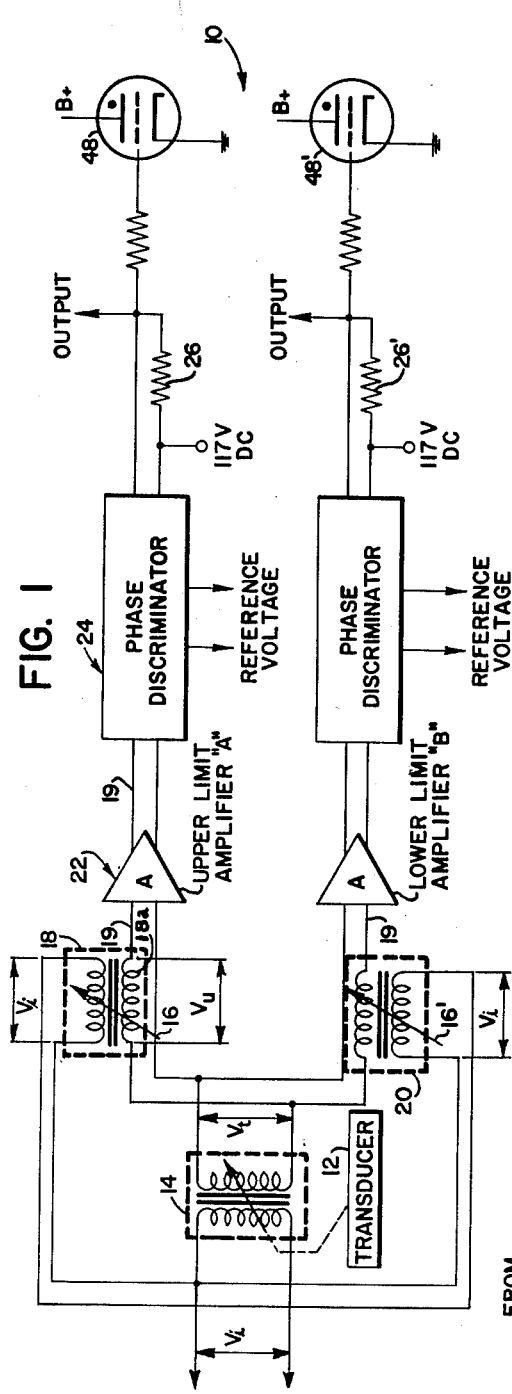
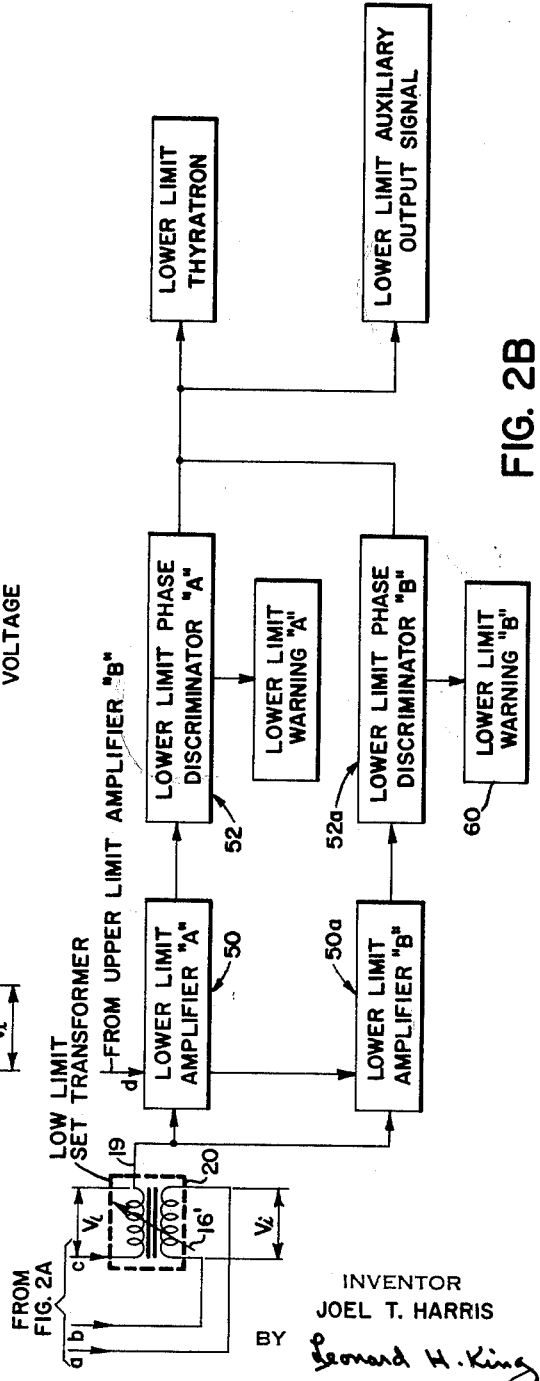
INVENTOR
JOEL T. HARRIS
BY Leonard H. King
ATTORNEY

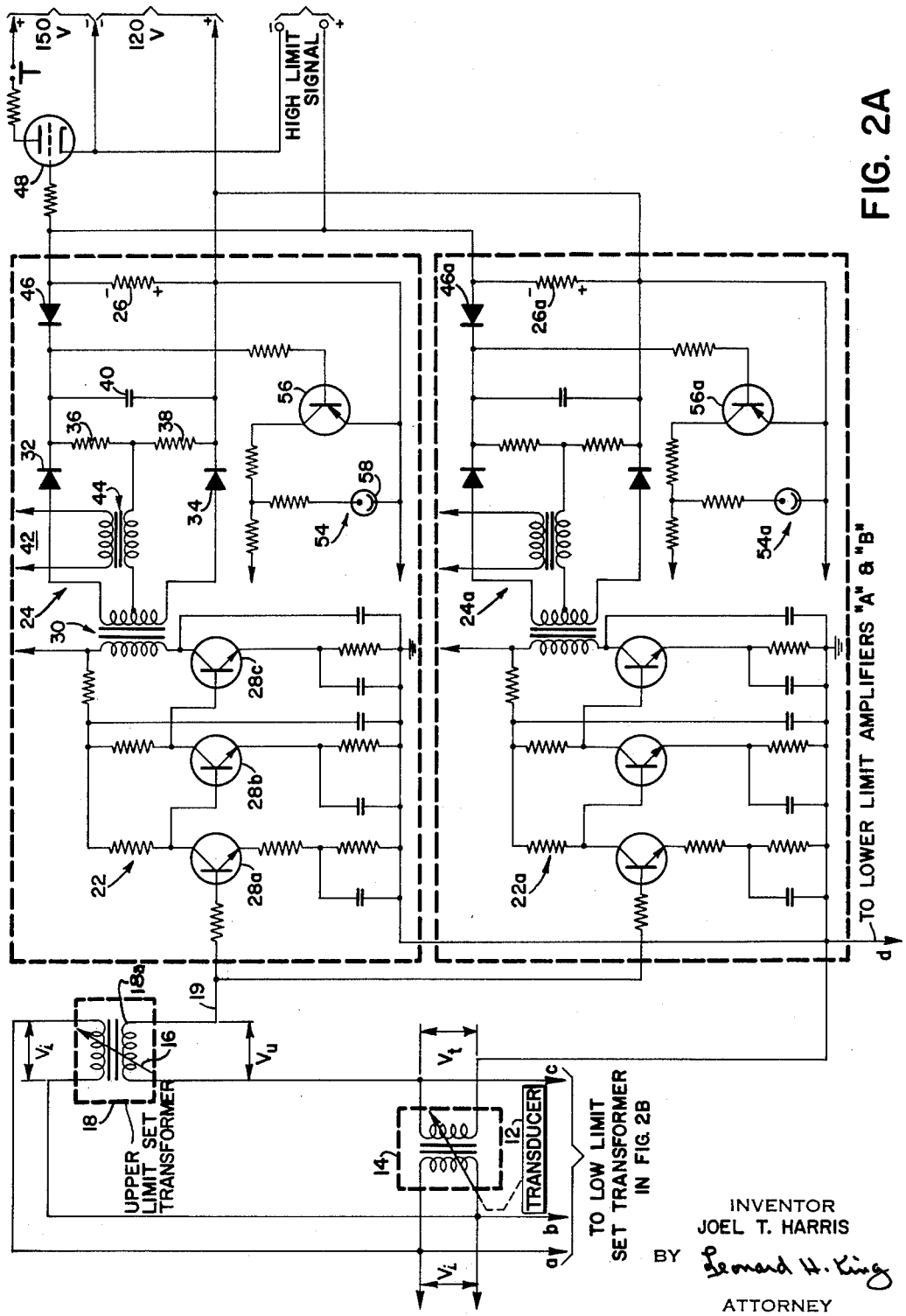

3,127,589
VOLTAGE PARAMETER MONITORING DEVICE
Joel T. Harris, Bronxville, N.Y., assignor to
Avien, Inc., Woodside, N.Y.
Filed Mar. 6, 1962, Ser. No. 177,825
1 Claim. (Cl. 340—149)

The present invention relates to a monitoring device whereby a warning is given whenever a variable voltage exceeds a preset high limit or goes below a preset low limit.

There are many applications where it is desired to compare the output from a sensing transducer against high and low limits, to assure that the condition being sensed remains within safe operating levels, and to provide visual or electrical warning signals if the measured parameter exceeds the high or falls below the low limit. The condition sensed may be flow, pressure, force, displacement, temperature, or some other parameter, wherein the sensing transducer can provide an output whose magnitude varies directly as the parameter being monitored, with the high and low limits being set to determine the range of excursion about the normal operating point.

The device of the present invention provides novel means for comparing this transducer output with the output of limit set references. Where the measured parameter exceeds the high limit or falls below the low limit, visual warning is provide for. It is also contemplated that a secondary warning device be incorporated to indicate failure of the monitoring circuit; that is, the device has a fail-safe provision whereby breakdown of the circuit causes the warning circuit to operate.

It is therefore the primary object of the present invention to provide means for comparing the output from a sensing transducer against limit set reference outputs.

It is a further object of the present invention to provide warning means if the measured parameter exceeds a high limit or falls below a low limit.

It is yet a further object of the present invention to provide visual indication means for circuit breakdown.

These and other objects of the present invention will be indicated in further detail or will become apparent from the following description with the figures apppended thereto, wherein:

FIG. 1 is a block diagram partly in schematic form of a device of the present invention.

FIGS. 2A and 2B taken together comprise a diagram, partly schematically and partly in block form, of the device of this invention.

Referring more specifically to the drawing, there is shown in FIG. 1, a device of the present invention, generally numbered 10, wherein a transducer device 12 varies the coupling of transformer 14 to alter the output voltage $V_T$, thus providing an indication of the condition being sensed. It will be understood that instead of a variable transformer, other transducer devices may be utilized to provide a variable A.C. output of constant phase. (It will also be understood that the output from the transducer could be a D.C. signal, in which case the D.C. signal would first be converted to A.C. by a chopping device.) The input to transformer 14 is an external reference A.C. voltage $V_1$ which is brought simultaneously to the primary of upper limit transformer 18 and lower limit transformer 20. Transformers 14, 18 and 20 are variable, transformer 14 being varied by the transducer device, and transformers 18 and 20 being manually adjustable by limit controls 16 and 16' respectively, to provide a set output voltage, which is the upper limit signal $V_U$ or lower limit signal $V_L$. The operation of the upper limit circuit will be discussed in detail, it being understood that the lower limit circuit is identical except for the limit set. The output $V_T$ of transformer 14 is series-connected to the secondary 18a of the limit transformer. However, the secondaries are 180° out of phase. Therefore, at each instant, the voltages $V_U$ and $V_T$ are in bucking relation; hence, the resultant, 19, will be a net voltage which is the difference between the limit voltage and the transducer-responsive voltage and having the phase of the larger signal. Difference voltage 19 is brought into amplifier 22 and upon amplification, to phase discriminator 24. The circuit components of amplifier 22 and phase discriminator 24 are selected to provide a D.C. output of at least 20 volts across output resistor 26 of phase discriminator 24, of the polarity indicated in FIG. 2A, when the phase of the input signal 19 is that of the reference voltage, and to have a D.C. output across this resistor of zero when difference voltage 19 is of the same phase as the output of the sensing transducer. That is, the amplifier taken with the phase discriminator operates as a switching device having two conditions, either a zero output or an output of over 20 volts, depending upon whether the transducer signal has exceeded the high level or whether it remains within the safe limit. Thus the condition of exceeding the safe limit is the condition of zero D.C. voltage output from the phase discriminator, while the condition of being within the said limit provides the condition of 20 volts or more D.C. of the indicated polarity output from the phase discriminator.

It will be apparent that the difference voltage 19, will vary according to the excursion of the transducer output, compared electrically to the high and low limits. These parameters are normally set so that this difference signal is large enough to yield the desired D.C. output after several stages of amplification in amplifier 22 and then rectification in discriminator 24. Amplifier 22 provides three stages of amplification by transistors 28a, 28b, 28c and associated circuits, whereby an input measured in millivolts will be easily given the required amplification. The circuit arrangement and the components chosen are those well known in the art, the collector supply for the amplifier transistors being set at 24 v. which will yield close to 20 v. usable output, the circuit saturating after this point. Amplifier 22 is coupled to phase discriminator 24 by transformer 30. This signal, an A.C. voltage, is rectified within the phase discriminator by the action of diodes 32, 34, to produce a pulsating D.C. voltage across resistors 36, 38. This D.C. is filtered by the action of capacitor 40, and has a polarity determined by the action of reference signal 42 impressed into the circuit across transformer 44. This reference signal is phased so that diodes 32 and 34 are gated "on" during the positive half cycle of the transducer signal, and therefore "off" during the positive half cycle of the limit signal. Thus, when the transducer signal is below the high limit and the input voltage to the discriminator has the phase of the limit voltage, the D.C. output across resistor 26 will have the polarity shown. When the transducer exceeds the limit voltage and the input voltage to the discriminator has the phase of the transducer voltage, the D.C. voltage across capacitor 40 reverses polarity and is blocked by diode 46 so that the voltage across resistor 26 goes to zero.

Since under normal operation the transducer is continuously below the high limit, the voltage across resistor 26 will be continually present.

Resistor 26 is part of the grid biasing system of thyratron 48 wherein the voltage across resistor 26 bucks the grid bias voltage of 120 volts bringing this down to 100 volts. This is below the igniting voltage for thyratron 48. In the condition of zero D.C. output from phase discriminator 24, the entire 120 volts appears at the grid and thyratron 48 fires, thus providing the desired warning signal. It will be obvious that this can take place only when the transducer voltage has equaled or exceeded that of the limiting voltage set at transformer 18, which means that an input signal 180° out of phase has been brought into the amplifier circuit. This is the condition which requires the warning system to come into operation.

In an identical manner, means are provided in the present invention to compare the output $V_T$ of sensing transducer 12 with the output $V_L$ of a low limit set control 16', which varies transformer 20. The circuit in this case, however, is designed to maintain a 20 volts D.C. output across the second amplifier-phase discriminator circuit 50–52, as shown in FIG. 2B. Therefore in this case the lower limit circuit is poled in favor of the transducer signal, and against the lower limit signal. Thus, as long as the transducer voltage is larger, its phase will cause a 20 volt D.C. output to appear across resistor 26'. If the transducer voltage equals or drops below the lower limit voltage, then the phase of the lower limit signal will assure that zero voltage appears across resistor 26'. Hence, the warning device will go into operation, as explained hereinabove.

To provide for maximum protection against circuit breakdown or malfunction, the device of the present invention provides for a parallel amplifier and discriminator circuit 22a–24a, operation as a redundant circuit, receiving the input signal from limit transformer secondary 18a simultaneously with the first amplifier discriminator circuit and providing an identical D.C. output across resistor R26a. Thus, failure of the first circuit would normally cause zero output across resistor 26, hence activating the warning system through igniting of thyratron 48. The use of the redundant circuit eliminates this since the voltage across resistor 26a remains in the thyratron grid biasing circuit, thus keeping the monitor in operation. It should be noted that diode 46 isolates the redundant circuit from the first amplifier-discriminator circuit, thus preventing loading of the working circuit, and allowing the desired output of 20 volts to appear across resistor 26a. While redundant circuitry helps to insure reliable operation, it will be apparent that this circuit may be left out if cost or size considerations so dictate for a particular application. In addition, any number of redundant circuits may be employed as reliability requirements dictate. If a redundant circuit were not employed, diode 46 would be eliminated, and a reverse polarity would appear across R26. In any event, thyratron 48 would fire.

As shown in FIG. 2, indicating circuit 54 is provided to show if there has been a failure in either of the amplifier-discriminator circuits. The 20 volt D.C. output of the discriminators is used to hold transistor 56 in saturation. Neon lamp 58, in parallel with transistor 56, will therefore not light. If the 20 volt D.C. discriminator output goes to zero, which would occur as a result of a circuit failure, then lamp 58 would have 100 volts across it thus lighting to indicate a failure. It will be seen that diode 46 effectively isolates transistor 56 from the voltage across resistor 26a of the redundant circuit. That is, upon a failure of the primary circuit, neon lamp 58 will light, even though voltage is present in resistor 26a, as this voltage is blocked by diode 46. A similar blocking action takes place in the other circuits where corresponding diodes are employed, for example, diode 46a. As noted in FIG. 2, the lower limit circuit has a similar redundant circuit 50a–52a in parallel with associated indicator circuit 60.

There has thus been provided in accordance with the present invention a device for monitoring the output of a sensing transducer for both upper and lower limits, with provisions for very high reliability through the use of redundant circuitry and an indicator circuit to give warning of circuit breakdown.

There has been disclosed heretofore the best embodiment of the invention presently contemplated and it is to be understood that various changes and modifications may be made by those skilled in the art without departing from the spirit of the invention.

I claim:

A signal monitoring device for monitoring a variable parameter for providing a control signal whenever said parameter is other than within a range defined by a predetermined high limit and a predetermined low limit, said device comprising:

(a) a source of A.C. reference voltage;

(b) a monitored signal input transducer having monitored signal output means, and means for automatically varying the monitored output signal responsive to said variable parameter;

(c) a high limit transformer having signal input means connected to said source of A.C. reference voltage, high limit signal output means whose output is 180° out of phase with the signal input to said signal input means, and means for manually varying the amplitude of the high limit output signal;

(d) an amplifier arranged to receive the output of said high limit transformer and the output of said monitored signal input transducer in a bucking relationship, whereby the difference will be amplified to provide an amplified difference signal;

(e) a phase discriminator adapted to receive said amplified difference signal, said phase discriminator having means for receiving said A.C. reference voltage for gating the output of said discriminator "on" during half cycles of a given polarity of the limit signal, and gate it "off" during the corresponding polarity half cycles of the transducer signal to produce said control signal whenever the monitored parameter exceeds the high limit;

(f) a low limit transformer having signal input means connected to said source of A.C. reference voltage, low limit signal output means whose output is 180° out of phase with the signal input to said signal input means, and means for manually varying the amplitude of the low limit output signal;

(g) an amplifier arranged to receive the output of said low limit transformer and the output of said monitored signal input transducer in a bucking relationship, whereby the difference will be amplified to provide an amplified difference signal; and (h) a phase discriminator adapted to receive said amplified difference signal, said phase discriminator having means for receiving said A.C. reference voltage for gating the output of said discriminator "on" during half cycles of a given polarity of the limit signal, and gate it "off" during the corresponding polarity half cycles of the transducer signal to produce said control signal whenever the monitored parameter exceeds the low limit.

References Cited in the file of this patent

UNITED STATES PATENTS

| | | |
|---|---|---|
| 2,473,457 | Tyson | June 14, 1949 |
| 3,025,414 | McVey | Mar. 13, 1962 |
| 3,039,024 | Spooner | June 12, 1962 |

FOREIGN PATENTS

| | | |
|---|---|---|
| 676,100 | Great Britain | July 23, 1952 |